United States Patent [19]

Frantz et al.

[11] 4,065,096

[45] Dec. 27, 1977

[54] SOLENOID-ACTUATED VALVE

[75] Inventors: Virgil L. Frantz, Salem; Thomas D. Taylor, Roanoke, both of Va.

[73] Assignees: Graham-White Sales Corporation; Graham-White Manufacturing Co., both of Salem, Va.

[21] Appl. No.: 701,514

[22] Filed: July 1, 1976

[51] Int. Cl.² .................. F16K 31/06; H01F 7/18
[52] U.S. Cl. ................... 251/137; 137/561 R; 335/256; 335/268
[58] Field of Search ........... 251/137; 335/256, 268, 335/199; 137/561 R

[56] References Cited
U.S. PATENT DOCUMENTS 2,472,553  6/1949  Theunissen .................. 335/256 X
2,519,607  8/1950  Steynor ...................... 251/137 X
3,415,487  10/1968  Robarge ...................... 251/137

FOREIGN PATENT DOCUMENTS 1,033,473  7/1958  Germany ..................... 251/137

Primary Examiner—Arnold Rosenthal
Attorney, Agent, or Firm—Wilmer Mechlin

[57] ABSTRACT

Solenoid-actuated valve adapted for heavy duty use by having the coil of the solenoid divided into high and low power windings connected in and automatically energized in succession by a solid state control circuit for providing in sequence high power of predetermined short duration for opening the valve and low power of usually longer duration for holding the valve in open position.

6 Claims, 6 Drawing Figures

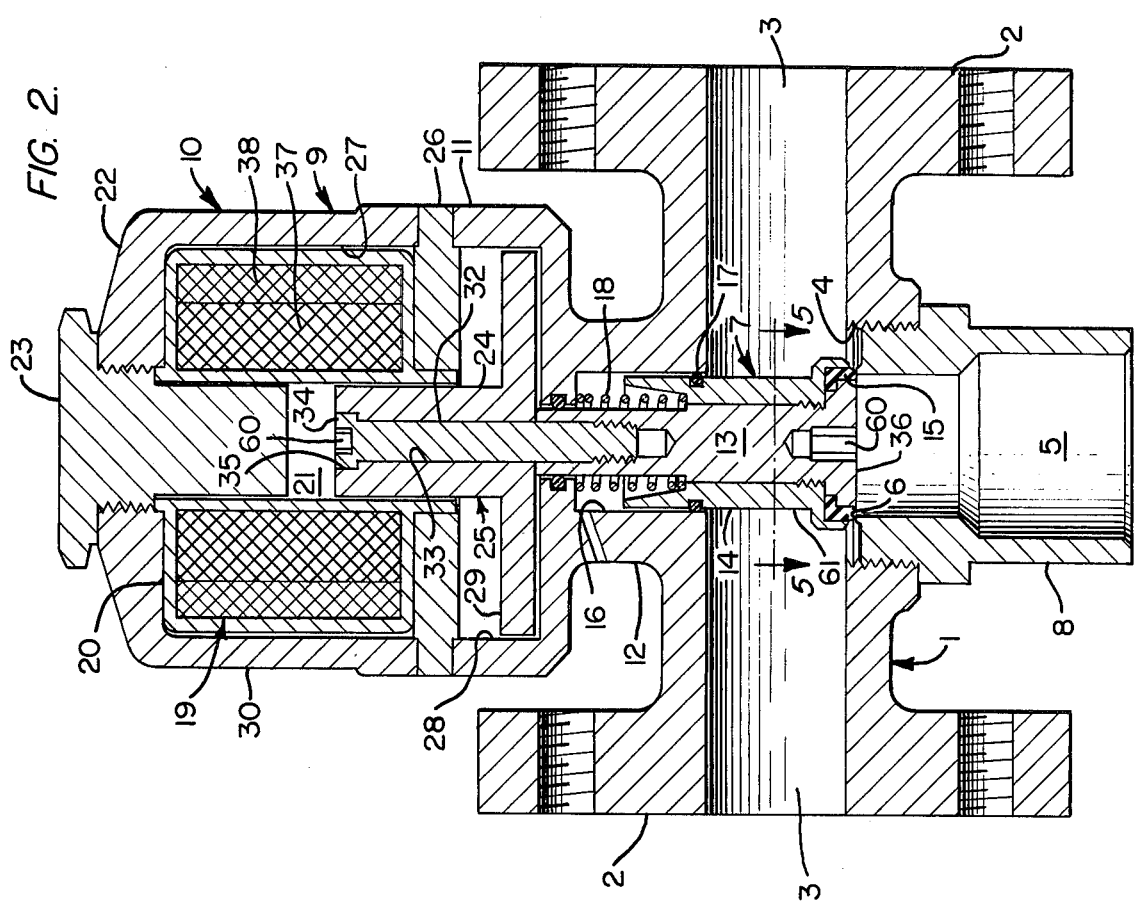
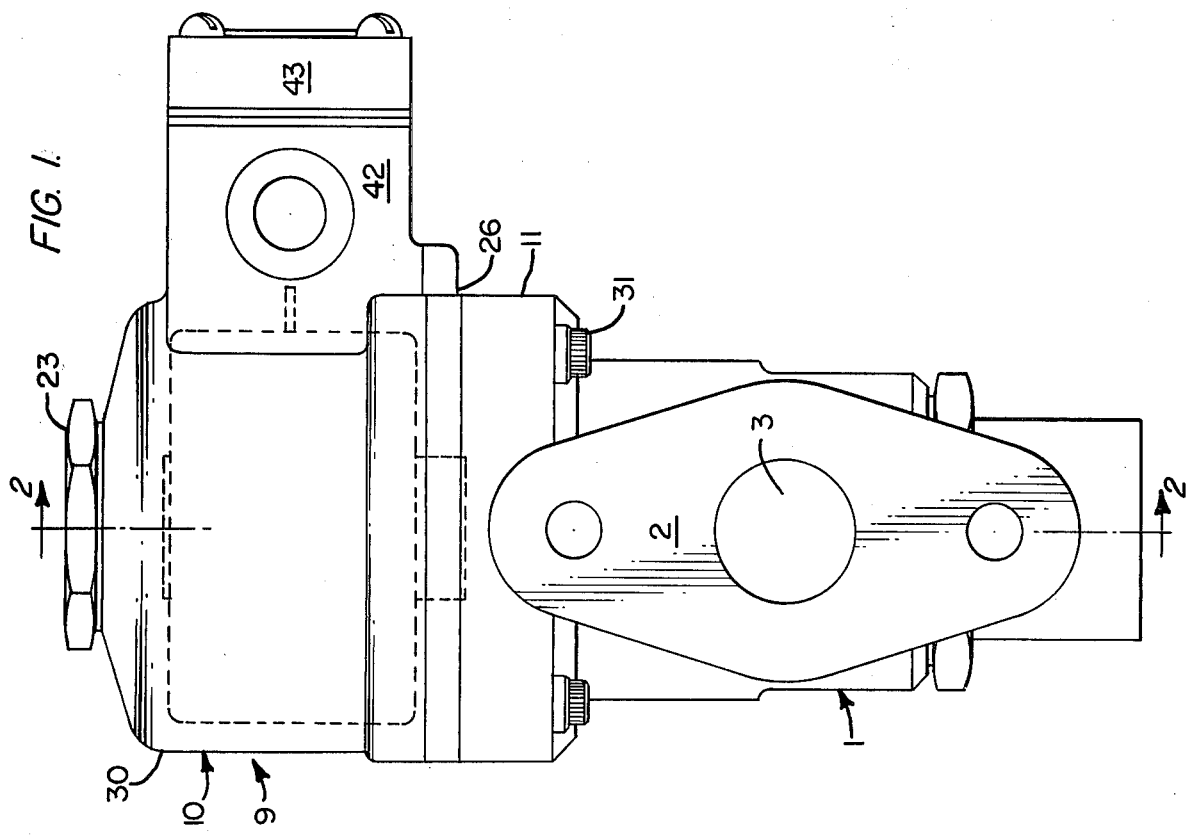

SOLENOID-ACTUATED VALVE

BACKGROUND OF THE INVENTION

Although solenoid-actuated valves are well suited for automatic remote control, because of the limited power developable by a conventional solenoid, such valves generally are limited in use to installations in which the solenoid actuation is opposed by low forces. Consequently, where the opposing forces are high, as in opening a lift valve against a considerable hydraulic head and a spring sufficiently strong to hold the valve normally closed, a solenoid-actuated valve is impractical except as a pilot valve, and some other means must be resorted to for directly actuating the lift valve. The problem posed by the shortcoming, powerwise, of solenoid-actuation is particularly apparent in attempting to render fool-proof the dumping of the usual plain water coolant from the cooling system of a diesel locomotive when the latter has to be shut down for repairs under freezing conditions and, as usual, the available expedient is a manually operated dump valve. It is with the adaptation of a solenoid-actuated valve for such heavy duty use that the present invention is particularly concerned.

SUMMARY OF THE INVENTION

The primary object of the present invention is to provide an improved solenoid-actuated valve, wherein the solenoid is so wound and controlled as to develop automatically in succession a short burst of high power for opening the valve without overheating and low power of any desired duration for holding the valve in open position.

Another object of the invention is to provide a solenoid-actuated valve in which the coil of the solenoid has high and low power windings connected in a control circuit and automatically energized sequentially in response to an adjustable timer subcircuit for successively developing high power for opening the valve without overheating and low power for holding the valve in open position.

An additional object of the invention is to provide in a solenoid-actuated valve a solenoid having high and low power windings connected in series in a solid state control circuit under adjustable timer control, whereby, by initially shunting the current past the low power winding to the high power winding and after a predetermined time delay passing the current through both windings, the solenoid is enabled in succession to develop high power for opening the valve without overheating and low power for holding the valve in open position.

A further object of the invention is to provide a solenoid-actuated valve so constructed and arranged as not only to enable the solenoid automatically to apply in succession high opening and low holding power to the valve but also to facilitate dissasembly for repair or replacement of components.

Other objects and advantages of the invention will appear hereafter in the detailed description, be particularly pointed out in the appended claims, and be illustrated in the accompanying drawings, in which:

FIGURE DESCRIPTION

FIG. 1 is a side elevational view of a preferred embodiment of the improved solenoid-actuated valve of the present invention;

FIG. 2 is a vertical sectional view taken along lines 2—2 of FIG. 1 with the valve closed;

DETAILED DESCRIPTION

Figure 4:
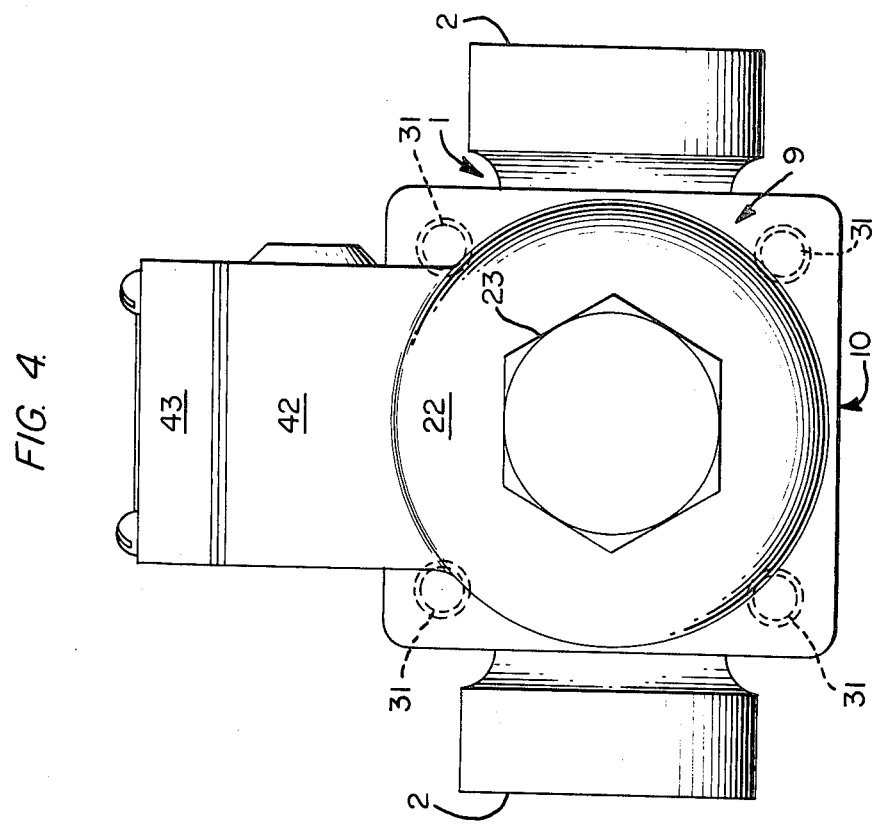
FIG. 4 is a plan view of the improved valve.
Figure 3:
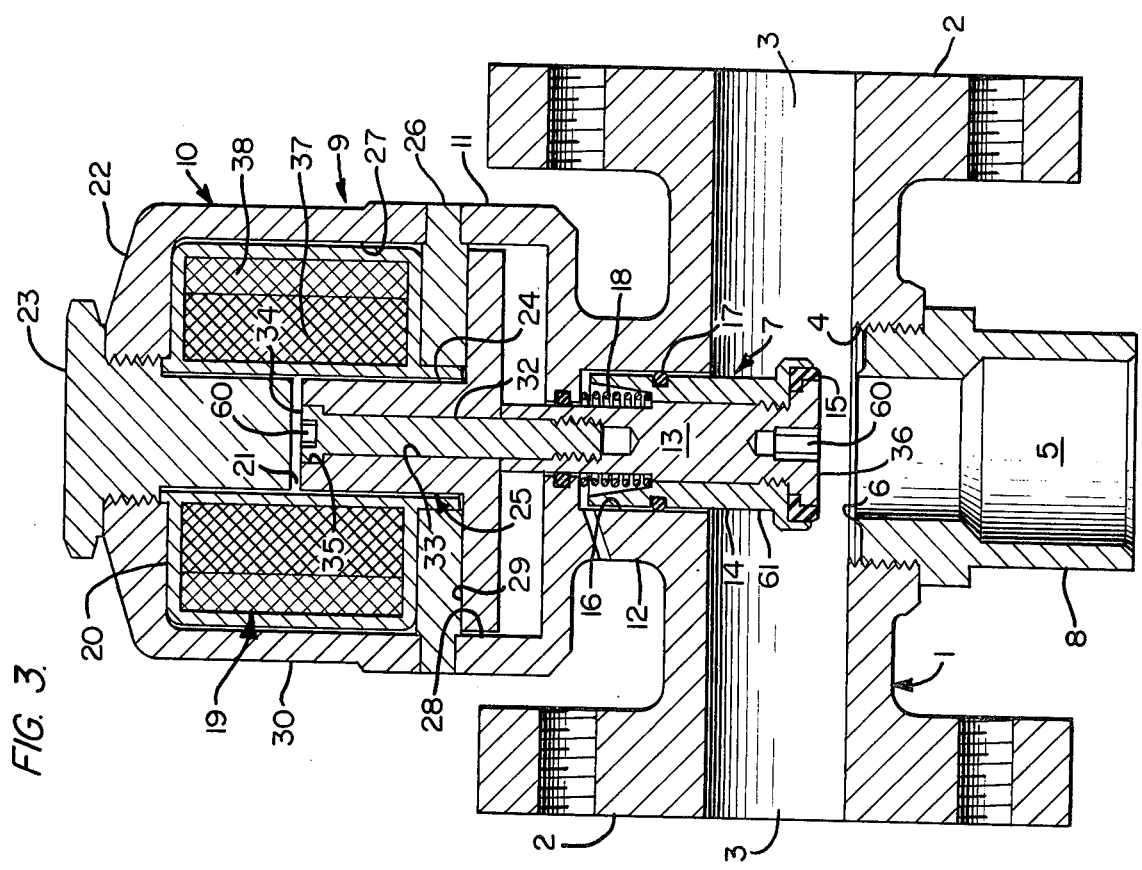
FIG. 3 is a view on the same section with the valve open.

Referring now in detail to the drawings in which like reference characters designate like parts, the improved solenoid-actuated valve of the present invention is adapted for uses in which a solenoid is called upon to exert automatically in succession an initial short burst of high power for opening a valve and low power of relatively long duration for holding the valve in open position. As exemplary of such a use, the improved valve has been illustrated as a dump valve for automatically dumping a plain water coolant from the cooling system of a diesel locomotive and will be so described.

In the exemplary embodiment, the improved valve is comprised of a body 1 having flanged ends 2 for connection at a low point in the piping (not shown) of a diesel locomotive cooling system. The body has an open-ended horizontal, longitudinal or axial bore 3 for normally passing water circulating in the system and a vertical, transverse or cross-bore 4 centrally intersecting the axial or main bore. For intermittently draining water from the system, the body has or is fitted with a downwardly opening drain port 5 having at its upper end, below the level of the axial bore 3, a valve seat 6 normally closed by a poppet valve or valve member 7, the drain port and seat preferably being formed respectively in and on a stub drain or dump tube 8 screwed into the lower end of the transverse bore 4.

A solenoid 9 for actuating the dump valve by unseating the valve member 7 from its seat 6, is housed or contained in a housing 10 mounted on top of the valve body 1 between the latter's ends 2. Divided vertically in the manner hereafter to be described, the preferred housing 10 has a lower part 11 cast or formed integrally with the valve body 1. The lower part 11 is integrally joined or connected to and spaced above the valve body 1 by a cylindrical boss 12 upstanding from the valve body and axially aligned with the cross-bore 4.

Of a diameter to be insertable and removable through the lower end of the cross-bore 4 on removal of the drain or dump tube 8, the preferred valve member 7 is of composite or multi-part construction with a solid inner stem or post 13 screwed from the bottom into a hollow outer stem or sleeve 14 and the stems holding or clamping between their enlarged lower ends an annular gasket or washer 15 for seating against and closing the valve seat 6. The outer stem 14 is axially or vertically slidable, shiftable or reciprocable in a bottom-opening valve chamber 16 in the boss 12, with leakage between the stem and chamber sealed against, as by an O-ring 17. The valve member 7 is spring-urged or loaded to its normal closed position by a coil spring 18 encircling the inner stem 13 and acting vertically between the upper end of the chamber 16 and both stems.

Within the housing 10, the solenoid has its coil 19 wound on a non-magnetic bobbin or spool 20. A cylindrical central aperture or opening 21 extending through the bobbin 20 and the top wall 22 of the housing 10, stationarily receives in its upper end the solenoid's core or primary magnet in the form of an electromagnetic plug 23 screwed into the top wall, and slidably receives and guides in its lower part the shank 24 of an inverted T-shaped plunger or armature 25. Made of ferro-magnetic or other suitable magnetically conductive metal, the housing 10, for containing or restricting the magnetic field of the coil 19, is divided vertically by a suitably cast iron disc 26 into an upper compartment 27 containing the spooled coil and a lower compartment 28 loosely containing the head 29 of the plunger 25. Separable for inserting and removing the coil 19 and plunger 25, the lower part 11 and upper part 30 of the housing 10 and interposed or intervening disc 26 are held in assembled relation by corner bolts 31.

The valve member 7 and its chamber 16 and the plunger 25 and its aperture 21 are all vertically aligned or concentric or coaxial and, for actuation, unseating or opening by the solenoid 9, the valve member is connected to the plunger by a connecting pin or bolt 32 coaxial with both members. The connecting pin 32 preferably is screwed or threaded into the inner stem or center post of the valve member and, above the inner stem 13, extends with a sliding fit through an axial bore 33 in the plunger's shank 24 and has an enlarged head 34 fitting or received in an upwardly opening cavity 35 in the shank at the upper terminus of the bore.

In its normal, down or valve-closed position, the plunger 25 rests or is supported on the upper end of the center post 13 of the valve member 7 to add its weight to the forces of the spring 18, hydraulic head and weight of the valve member and therewith hold the latter normally closed. While desirable for ensuring against accidental dumping of the plain water coolant, the total of these opposing forces, in the exemplary heavy duty installation, will exceed the power the solenoid 9 can develop and sustain without overheating. Yet, the solenoid 9, acting directly on the valve member 7, must not only open the valve member to start or initiate the dumping of the water, but hold that member open until the cooling system has been completely drained. The required opening and holding forces are not the same, since, once the valve member 7 has been unseated, the larger area of its previously covered face or lower end 36 will produce an overbalance or resultant in an opening or upward direction of the forces of the water on the valve member and this condition will obtain so long as there is water in the bore 3. Then not opposed but assisted by the resultant hydraulic force of the initially very substantial or considerable head in the cooling system, the solenoid 9 need only exert a relatively low force within its sustainable capacity, to hold the valve member open against the remaining opposing forces until the water in the cooling system has been completely dumped or drained. After a sufficient interval for complete drainage, the solenoid 9 will be deenergized, as by a time delay switch (not shown), to release the valve member 7 for return to closed position under force of the spring 18.

In the solenoid-actuated valve of the present invention, the solenoid 9 is given the desired dual or plural power capability by dividing or splitting the coil 19 radially or laterally into a pair or plurality of longitudinally coextensive, concentric, epoxy-impregnated or otherwise suitably relatively insulated windings, one inside the other, the inside or inner a high power or wattage starting or opening winding 37 and the outside or outer a low power or wattage holding winding 38. In functioning as intended, the starting winding 37 is first energized in response to the sensing of an ambient temperature indicative of the presence of likelihood of a freezing condition and, after a predetermined time delay sufficient to enable the solenoid 9 to open the valve member 7 but of too short duration to cause overheating, the holding winding 38 is energized to hold the valve member in open position.

Figure 6:
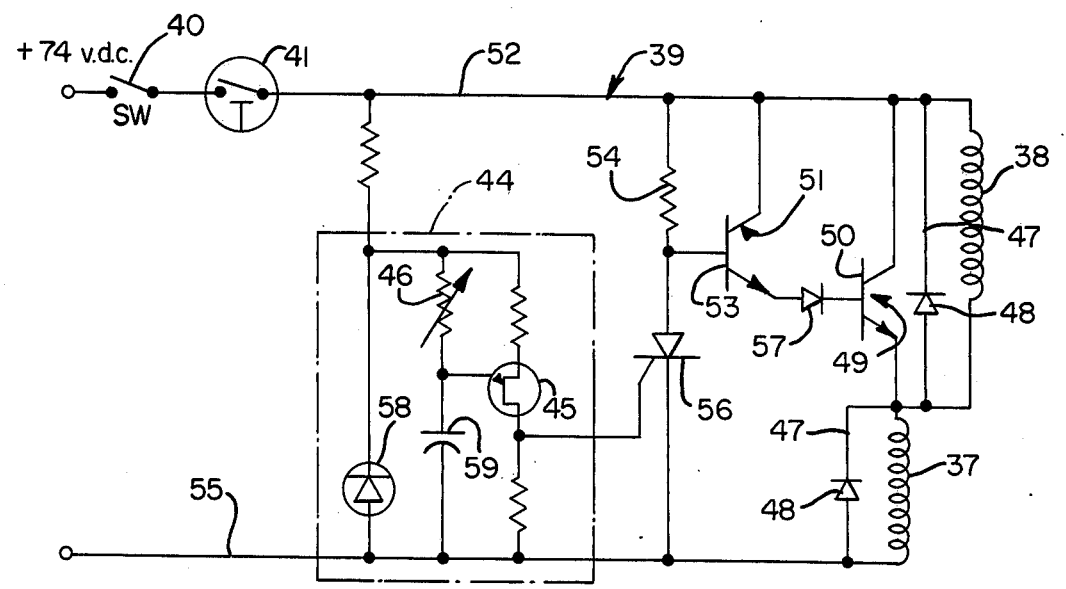
FIG. 6 is a diagram of a preferred control circuit.

The automatic sequential or successive energizing of the opening and holding windings 37 and 38 is obtained or produced by connecting or wiring them in a control circuit 39. As shown in the wiring diagram of FIG. 6, the preferred control circuit 39, for compactness and endurance, is a solid state circuit connectable to a battery bank or other direct current supply or source (not shown) and having in series in its positive lead to the source a master, suitably manual, on-off switch 40 and a thermostat or thermostatic switch 41, the latter exposed to ambient air and closing on sensing a predetermined temperature, which, for a margin of safety, preferably is somewhat above freezing and around 40° F (4.4° C). For receiving the conduit connecting it to the power source, the solenoid 9 has on the outside of its housing 10, a suitably integral, radially outstanding junction box 42. Except for the windings 37 and 38 and switches 40 and 41, the control circuit 39 conveniently is contained in a removable recessed cap 43 of the box 42 and, for sealing and electrical insulation, is encapsulated or embedded in an epoxy or other suitable non-conducting plastic matrix.

For efficient action of the solenoid 9, it is desirable to maintain or preserve the proximity of the energized part or parts of the coil 19 to the plunger 25 during both the opening and holding stages. Rather than being alternately energized, the windings 37 and 38 in the preferred control circuit 39, are connected or wired in series, with provision in the circuit for initially shunting current past the low power, high resistance winding 38 to the high power, low resistance winding 37 and, after a predetermined time delay, passing current through both windings, thus reducing the current through the winding 37 to the relatively low level of the current through the winding 38. To accomplish this, the preferred control circuit 39 includes a conventional solid state timer circuit 44 having a unijunction transistor 45 adjustable in firing time by a variable resistor 46.

In addition to the timer circuit 44, the preferred control circuit 39 includes for each of the windings 37 and 38 a dissipating circuit 47 containing the winding and a free-wheeling diode 48 for protecting the other components of the control circuit from any spikes emitted from either winding. For initially energizing only the high power winding, the control circuit 39 has as a shunt a shunting or switching transistor 49 wired in parallel with the low power winding 38 and conductive so long as a substantial voltage is applied to its base 50. A second or switching transistor 51, connected between the control circuit's positive or input lead or side 52 and the first or shunt transistor 49, applies the necessary voltage to the latter's base 50 so long as its own base 53 is charged from the input side through an interposed resistance 54. The base 53 of the second transistor 51 also is connected to the ground side 55 of the control circuit 39 through an SCR 56, which in turn is connected to the output side of the unijunction transistor 45.

With the first or shunting and second or switching transistors 49 and 51 and SCR 56 connected in the above manner and the SCR then turned off or open, only the high power winding 37 will be energized when power is first supplied to the control circuit by closing of the switches 40 and 41. However, when, after the time delay or interval predetermined by the setting of the variable resistor 46, the voltage on the unijunction transistor 45 has built up to firing potential, that transistor will fire and, by the pulse transmitted thereto, gate or turn on the SCR 56, whereafter the SCR will remain on or conductive so long as power is supplied to the control circuit 39. The immediate result is to turn off the second transistor 51 by discharging its base 53 to ground through the SCR 56. The consequent cutting off of the power through the second transistor 51 to the base 50 of the shunt transistor 49, preferably with the assistance of an interposed biasing diode 57, drops the voltage on the base 50 below operating potential, thus turning off or rendering non-conductive the shunt transistor and diverting current to the low power winding 38. Since connected in series, both of the windings 37 and 38 are then energized at the power and current levels of the low power winding and the windings act together as a low power holding winding or coil.

With the disclosed control circuit 39, the solenoid 9 thus possesses the desired dual or plural power capability and holding the time delay before shifting from high to low power within a range precluding overheating of the starting winding 37, is simply a matter of predetermining the setting of the variable resistor 46 and using solid state components suited to the supply voltage and wattages of the starting and holding windings. The availability of the high opening or starting power also enables the force exertable by the return spring 18 to be as much as about twenty pounds, a force ample for ensuring that the valve member 7 will remain closed except when the coolant water is being dumped from the cooling system.

Figure 5:
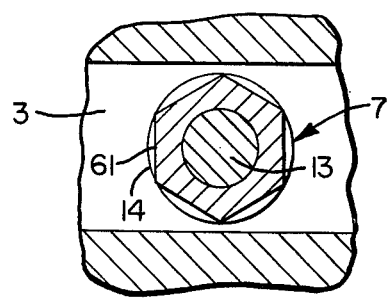
FIG. 5 is a fragmentary horizontal sectional view taken along lines 5—5 of FIG. 2.

In the exemplary wiring diagram of FIG. 5, the values or types of the various components are as follows:

| | |
|---|---|
| Supply voltage | 74 v dc |
| Winding 37 | 300 w |
| Winding 38 | 30 w |
| Resistances 54 and to timer circuit 44 | 75 K, 1 w |
| In timer circuit: | |
| Variable resistor 46 | 250 K |
| Zener diode 58 | 18 v, 1 w |
| Capacitor 59 | 4 mfd, 35 v |
| Unijunction transistor 45 | 2N2646 (JADEC) |
| Resistances on positive and ground sides of 45 | 270 and 100 ohms, respectively |
| SCR 56 | IR106D |
| Transistor 49 | 1R409 |
| Transistor 51 | D44R3 |
| Biasing diode 57 | 1000 p.i.v., 2.5 a |
| Free-wheeling diodes 48 | 1000 p.i.v., 2.5 a |

A complete disassembly of the improved valve will include detachment of the upper part 30 and disc 26 of the solenoid housing 10 from the lower part 11 by removing the bolts 31. However, except at long intervals, the only disassembly usually needed for periodic inspections will be of the parts of the valve member 7 from each other, disconnection of the member from the plunger 25 and removal of the valve member from the valve body 1. To facilitate such disassembly in a practical order, the inner stem 13 and connecting pin 32 have in and centered on their opposite ends hexagonal or other out-of-round sockets 60 for receiving suitable socket wrenches, and the outer stem 14 has adjacent its lower end a hex or like flat-sided gripping portion 61 for gripping by or taking a wrench of the jaw type. With this arrangement, exposure of the socket 60 in the connecting pin 32 by removing the core plug 23, enables the pin to be unscrewed and valve member disconnected from the plunger 25 by socket wrenches inserted in both of the sockets. Either then or, if desired, beforehand, the drain tube 8 is removed from the lower end of the crossbore 4 for enabling the valve member 7 to be removed therethrough. Once exposed, the valve member can readily be disassembled for inspection and, if necessary, replacement of the washer 16 or some other part, by appropriate wrenches applied to the socket 60 in the inner stem 13 and the gripping portion 61 on the outer stem 14.

From the above detailed description it will be apparent that there has been provided an improved solenoid-actuated valve in which a solenoid having a plural winding coil is automatically operable to apply in succession high power for opening the valve and low power for holding the valve in open position. It should be understood that the described and disclosed embodiment is merely exemplary of the invention and that all modifications are intended to be included that do not depart from the spirit of the invention and the scope of the appended claims.

Having now described our invention, we claim:

1. A solenoid-actuated valve, comprising a valve member, a solenoid having a coil divided into a plurality of windings of different power, and a solid state control circuit connecting said windings in series to a direct current power source for automatically energizing in succession a high power of said windings to open said valve member and a low power of said windings to hold said valve member in open position, said control circuit, for predetermining a time delay between energizing of said high and low power windings of a duration to preclude overheating of said high power winding, including switching transistor means connected in parallel with said low power winding for initially shunting current therepast, initially off SCR means between said switching transistor means and ground, and a unijunction transistor for turning on said SCR means after said predetermined time delay and by discharging said switching transistor means to ground diverting current to and energizing said low power winding.

2. A solenoid-actuated valve according to claim 1, wherein the control circuit is a solid state circuit encapsulated for sealing and electrical insulation in a non-conducting plastic matrix.

3. A solenoid-actuated valve according to claim 1, wherein the windings are axially coextensive and concentric, and the high power winding is inside the low power winding and reduced to the same low power level on energizing of the low power winding.

4. A solenoid-actuated valve according to claim 3, wherein the valve is a dump valve for dumping a water coolant from the cooling system of a shut-down diesel locomotive, and including temperature sensitive switch means in a lead between the control circuit and the power source for enabling the valve to dump the coolant on sensing of a temperature condition likely to cause freezing thereof.

5. A solenoid-actuated dump valve according to claim 4, including a valve body in which the valve member is mounted, a housing mounted on the valve body and housing the coil and an inverted T-shaped plunger of the solenoid, a junction box mounted on said housing and containing the control circuit, and magnetically conductive means dividing said housing vertically into an upper compartment containing the coil and a lower compartment containing a head of said plunger for restricting the magnetic field of the solenoid substantially to said upper compartment.

6. A solenoid-actuated valve according to claim 5, wherein the valve member is of plural part construction, and including means for enabling the valve member to be removed from the valve body and disassembled without disassembling the solenoid.

* * * * *